(12) United States Patent
Kanbayashi et al.

(10) Patent No.: US 10,185,357 B2
(45) Date of Patent: Jan. 22, 2019

(54) WATERPROOF APPARATUS

(71) Applicant: FUJITSU LIMITED, Kawasaki-shi, Kanagawa (JP)

(72) Inventors: Satoshi Kanbayashi, Kawasaki (JP); Shingo Yamaguchi, Kawasaki (JP); Hayato Shida, Kawasaki (JP); Satoshi Watanabe, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/874,195

(22) Filed: Jan. 18, 2018

(65) Prior Publication Data
US 2018/0210501 A1 Jul. 26, 2018

(30) Foreign Application Priority Data

Jan. 24, 2017 (JP) .................. 2017-010580

(51) Int. Cl.
*G06F 1/16* (2006.01)
*A45C 11/00* (2006.01)
*H04B 1/38* (2015.01)

(52) U.S. Cl.
CPC ...... *G06F 1/1626* (2013.01); *A45C 2011/002* (2013.01); *H04B 2001/3894* (2013.01)

(58) Field of Classification Search
CPC . H05K 5/03; H05K 5/06; H05K 5/061; G06F 1/1626; H04B 2001/3894; A45C 2011/002; H01R 13/5213
USPC ............. 361/679.01, 679.02, 679.26–679.3, 361/679.37–679.39, 679.55–679.58; 439/135, 136
See application file for complete search history.

(56) References Cited

U.S. PATENT DOCUMENTS

| 2005/0124191 A1* | 6/2005 | Stanton | H01R 13/5213 439/135 |
| 2014/0080334 A1* | 3/2014 | Tetsuya | H01R 13/5213 439/136 |
| 2014/0084770 A1* | 3/2014 | Tsai | G06F 1/1679 312/326 |
| 2014/0368994 A1* | 12/2014 | Lee | G06F 1/1656 361/679.55 |

(Continued)

FOREIGN PATENT DOCUMENTS

| JP | 10-334981 | 12/1998 |
| JP | 2011-244247 | 12/2011 |

*Primary Examiner* — Steven T Sawyer
*Assistant Examiner* — Sagar Shrestha
(74) *Attorney, Agent, or Firm* — Fujitsu Patent Center

(57) ABSTRACT

A waterproof apparatus includes a case having a communication hole that allows an inside and an outside of the case to communicate with each other, and a waterproof cap that closes the communication hole, wherein a first contact surface and a second contact surface extend in the communication hole and at different levels, wherein the waterproof cap includes a plate-like first elastic member that is longer than the communication hole in a long-side direction of the communication hole, and a second elastic member attached to a surface of the first elastic member, the surface facing the communication hole, and wherein when the first elastic member that is in a bent state is brought into contact with the first contact surface, the waterproof cap is retained on an inner wall of the communication hole with a restoring force exerted by the first elastic member.

13 Claims, 16 Drawing Sheets

(56) References Cited

U.S. PATENT DOCUMENTS

2016/0060953 A1* 3/2016 Huang ............... G06F 1/1656
                                                    49/394
2016/0360630 A1* 12/2016 Oda .................. A45C 11/00

* cited by examiner

WATERPROOF APPARATUS

CROSS-REFERENCE TO RELATED APPLICATIONS

This application is based upon and claims the benefit of priority of the prior Japanese Patent Application No. 2017-10580, filed on Jan. 24, 2017, the entire contents of which are incorporated herein by reference.

FIELD

The embodiments discussed herein are related to a waterproof apparatus.

BACKGROUND

An increasing number of recent-year electronic apparatuses and the like are provided with batteries there inside and are occasionally used outdoors. Many of portable electronic apparatuses, such as mobile terminals, intended for outdoor use are waterproof so as to withstand rain. Not only such portable electronic apparatuses but also many of apparatuses for outdoor use are waterproof.

FIG. 1A is a perspective view of a mobile terminal 1 as an exemplary waterproof apparatus 1. While the mobile terminal 1 as an exemplary waterproof apparatus 1 will be described hereinafter, the two are denoted by the same reference numeral. Note that the waterproof apparatus 1 is not limited to a portable electronic apparatus such the mobile terminal 1 and may be a stationary apparatus intended for outdoor use. The mobile terminal 1 includes a display unit and an operation unit. A case 2 of the mobile terminal 1 has a communication hole 3 in which connection terminals for external devices such as a headphone and a storage medium are provided. In general, as illustrated in FIG. 1B, the communication hole 3 is closed with a cap 4 that is attachable to and detachable from the case 2. If the mobile terminal 1 is waterproof, the cap 4 closing the communication hole 3 serves as a waterproof cap 4 having a water-stopping function. A configuration of the waterproof cap 4 according to a comparative technique will now be described with reference to FIGS. 1C to 1E.

FIG. 1C is an enlarged sectional view of the waterproof cap 4 illustrated in FIG. 1B that is taken along line IC-IC. FIG. 1D is a side view of the mobile terminal 1 illustrated in FIG. 1A. FIG. 1E is a sectional view of part of the mobile terminal 1 illustrated in FIG. 1D that is taken along line IE-IE, and illustrates a configuration of the waterproof cap 4 according to the comparative technique.

The waterproof cap 4 includes a flat portion 7 and a peripheral wall 8. The peripheral wall 8 is a continuous wall projecting from the flat portion 7. An O ring 9 serving as a water-stopping member is fitted around the peripheral wall 8 and near the tip of the peripheral wall 8. The O ring 9 is typically an elastic member made of rubber or the like. The communication hole 3 provided in the case 2 has an inner wall 3A with which the O ring 9 is brought into contact and a contact portion 6 with which a tip 8T of the peripheral wall 8 of the waterproof cap 4 is brought into contact. The inside and the outside of the case 2 is continuous with each other through a communication portion 5. In a state where the communication hole 3 is closed by the flat portion 7 of the waterproof cap 4, the O ring 9 is pressed against the inner wall 3A of the communication hole 3 and is thus compressed as illustrated in FIG. 1E. Hence, the O ring 9 exerts the water-stopping function, and the waterproof cap 4 is less likely to come off the communication hole 3.

The waterproof cap 4 according to the comparative technique exerts the water-stopping function by using the O ring 9 that is compressed in a direction orthogonal to a direction in which the waterproof cap 4 is fitted into and removed from the communication hole 3. Hence, when the waterproof cap 4 is fitted into and removed from the communication hole 3, the waterproof cap 4 is slid with the O ring 9 being compressed. Therefore, the O ring 9 tends to be damaged with scars or the like after repeated fitting/removal of the waterproof cap 4. Consequently, the water-stopping function of the case 2 may be deteriorated. To solve such a problem, the O ring 9 may be compressed in the same direction as the direction of fitting/removal of the O ring 9 into/from the communication hole 3. To realize such a structure, however, the strength of the flat portion 7 of the waterproof cap 4 has to be increased or the O ring 9 has to be held by another member. Consequently, the size of the apparatus may increase, or the design of the apparatus may be degraded.

The followings are reference documents.
[Document 1] Japanese Laid-open Patent Publication No. 10-334981, and
[Document 2] Japanese Laid-open Patent Publication No. 2011-244247.

SUMMARY

According to an aspect of the invention, a waterproof apparatus includes a case having a communication hole that allows an inside and an outside of the case to communicate with each other, and a waterproof cap that closes the communication hole, wherein a first contact surface and a second contact surface extend in the communication hole and at different levels, wherein the waterproof cap includes a plate-like first elastic member that is longer than the communication hole in a long-side direction of the communication hole, and a second elastic member attached to a surface of the first elastic member, the surface facing the communication hole, and wherein when the first elastic member that is in a bent state is brought into contact with the first contact surface, the waterproof cap is retained on an inner wall of the communication hole with a restoring force exerted by the first elastic member while the second elastic member comes into contact with the second contact surface such that water entry is stopped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
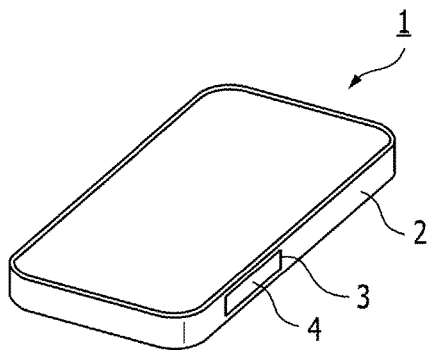
FIG. 1A is a perspective view of a mobile terminal as an exemplary waterproof apparatus according to a comparative technique.
Figure 1B:
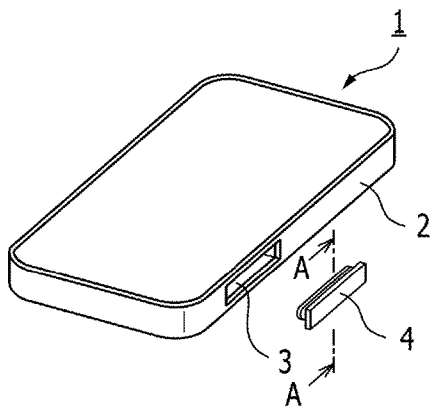
FIG. 1B is a perspective view of the mobile terminal illustrated in FIG. 1A, with a waterproof cap thereof removed.
Figure 1C:
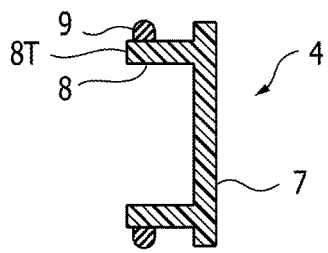
FIG. 1C is a sectional view of the waterproof cap that is taken along line IC-IC illustrated in FIG. 1B.
Figure 1D:
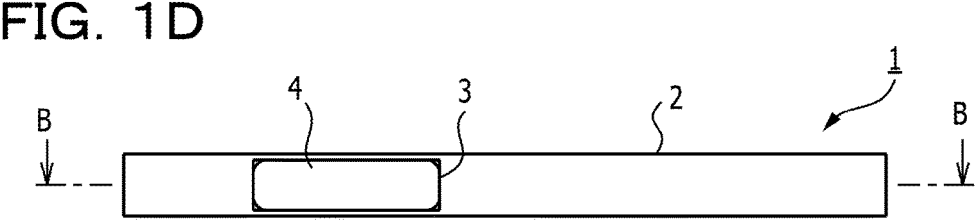
FIG. 1D is a side view of the mobile terminal illustrated in FIG. 1A.
Figure 1E:
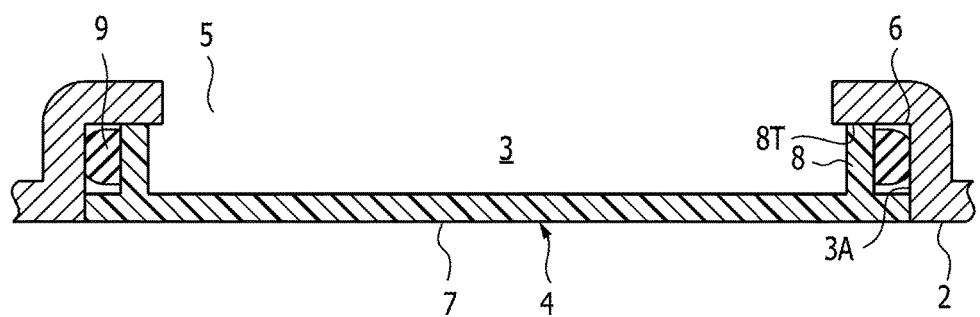
FIG. 1E is a sectional view of the waterproof cap that is taken along line IE-IE illustrated in FIG. 1D.

Hereinafter, embodiments of the present application will be described in detail with reference to the accompanying drawings illustrating specific examples. In the following description of embodiments, identical or similar elements are denoted by common reference numerals and characters. For easy understanding, the drawings are not necessarily to scale.

Figure 2A:
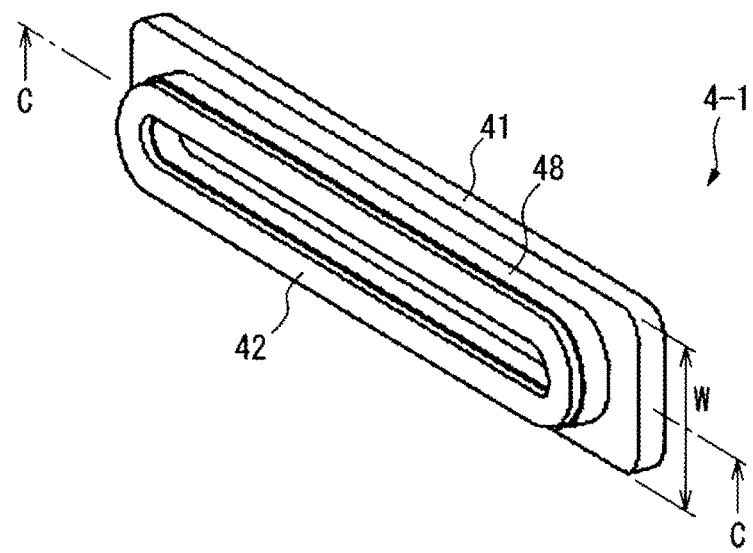
FIG. 2A is a perspective view of a first exemplary waterproof cap according to the present application.
Figure 2B:
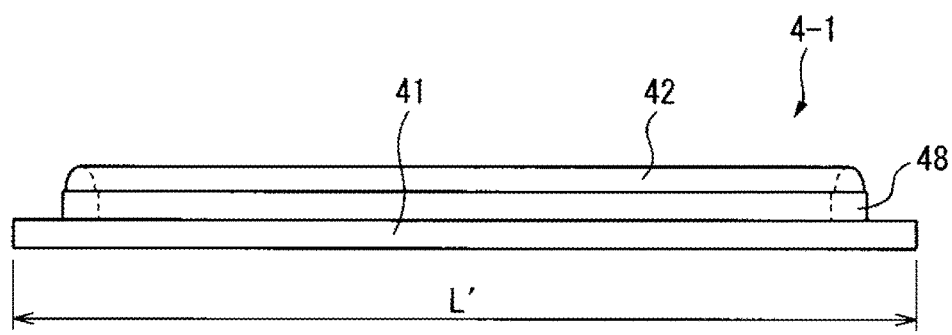
FIG. 2B is a side view of the waterproof cap illustrated in FIG. 2A.
Figure 2C:
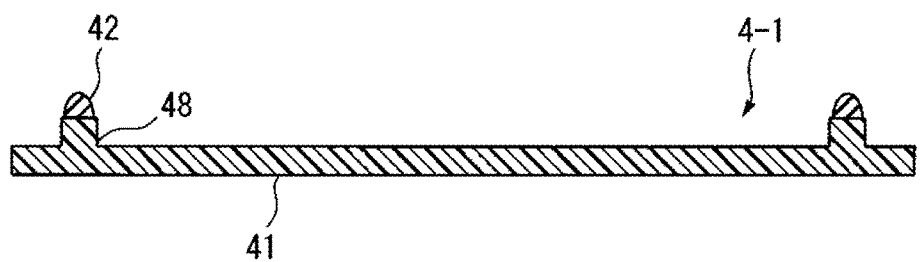
FIG. 2C is a sectional view of the waterproof cap that is taken along line IIC-IIC illustrated in FIG. 2A.

FIG. 2A is a perspective view of a first exemplary waterproof cap 4-1 according to the present application. FIG. 2B is a side view of the waterproof cap 4-1 illustrated in FIG. 2A. FIG. 2C is a sectional view of the waterproof cap 4-1 illustrated in FIG. 2A that is taken along line IIC-IIC. In the following description, reference numeral 4 represents the waterproof cap, and reference numeral 4-N denotes an N-th exemplary waterproof cap 4. Likewise, reference numeral 3 represents the communication hole, and reference numeral 3-N denotes an N-th exemplary communication hole 3. Furthermore, reference numeral 10 represents the mobile terminal, and reference numeral 10-N denotes a mobile terminal according to an N-th embodiment.

The waterproof cap 4-1 includes a first elastic member 41 having a plate-like shape. The first elastic member 41 is provided with a peripheral wall 48 projecting therefrom. The peripheral wall 48 is provided with a second elastic member 42 at the tip thereof. The first elastic member 41 includes a contact surface to be brought into contact with a first contact surface provided in a communication hole, which will be described below. The waterproof cap 4-1 is fitted into the communication hole until the two contact surfaces come into contact with each other. Typically, the first elastic member 41 and the peripheral wall 48 may be made of flexible synthetic resin. The second elastic member 42 may be a soft member made of silicon rubber or the like and being capable of stopping water entry from the joint surface. Herein, the short-side length (the width) of the first elastic member 41 is denoted by W, and the long-side length of the first elastic member 41 is denoted by U.

Figure 3A:
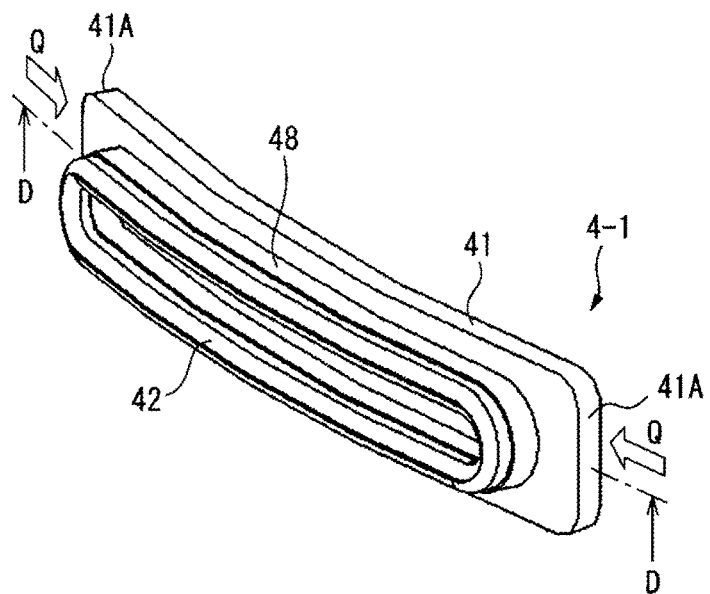
FIG. 3A is a perspective view of the waterproof cap illustrated in FIG. 2A and illustrates a state of the waterproof cap that is deformed by receiving forces at two long-side ends thereof, respectively.
Figure 3B:
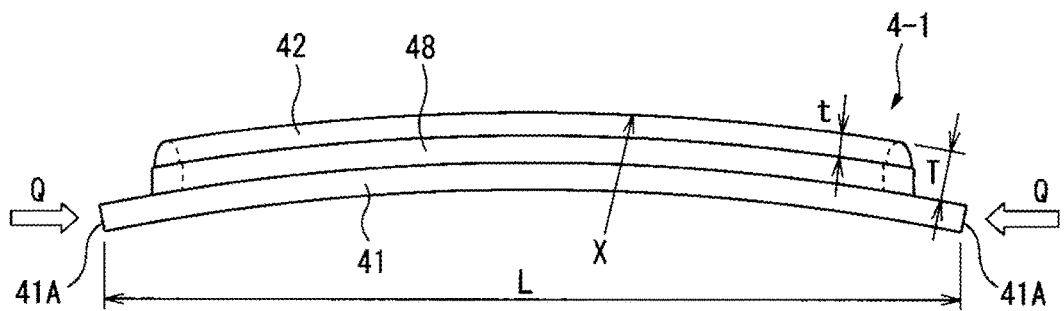
FIG. 3B is a side view of the waterproof cap illustrated in FIG. 3A.
Figure 3C:
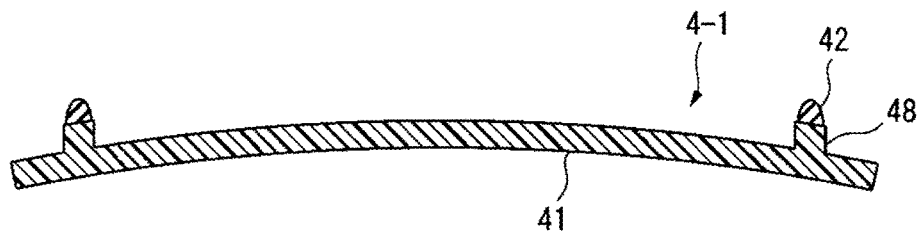
FIG. 3C is a sectional view of the waterproof cap that is taken along line IIIC-IIIC illustrated in FIG. 3A.

FIG. 3A is a perspective view of the waterproof cap 4-1 illustrated in FIG. 2A and illustrates a state of the waterproof cap 4-1 that is deformed by receiving forces Q at two long-side end surfaces 41A thereof, respectively. FIG. 3B is a side view of the waterproof cap 4-1 illustrated in FIG. 3A. FIG. 3C is a sectional view of the waterproof cap 4-1 that is taken along line IIIC-IIIC illustrated in FIG. 3A.

When the two long-side end surfaces 41A of the first elastic member 41 of the waterproof cap 4-1 are pressed with the forces Q, the first elastic member 41 generally bends. Consequently, the long-side length of the first elastic member 41, which has the original length U, changes to a length L (L'>L), and the second elastic member 42 bends with a radius X. In this case, the first elastic member 41 is deformed within the elastic limit. In FIG. 3B, reference numeral t denotes the original height of the second elastic member 42, and reference numeral T denotes the height from the surface of the first elastic member 41 to the end of the second elastic member 42.

Figure 4A:
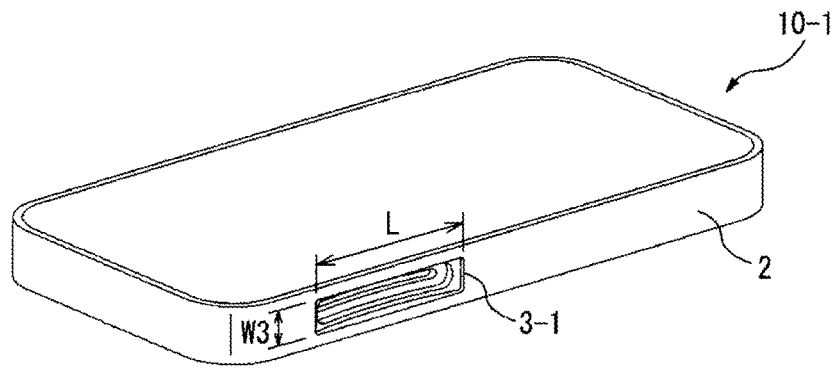
FIG. 4A is a perspective view of a mobile terminal according to a first embodiment disclosed that has a first exemplary communication hole into which the waterproof cap illustrated in FIGS. 3A to 3C is to be fitted.
Figure 4B:
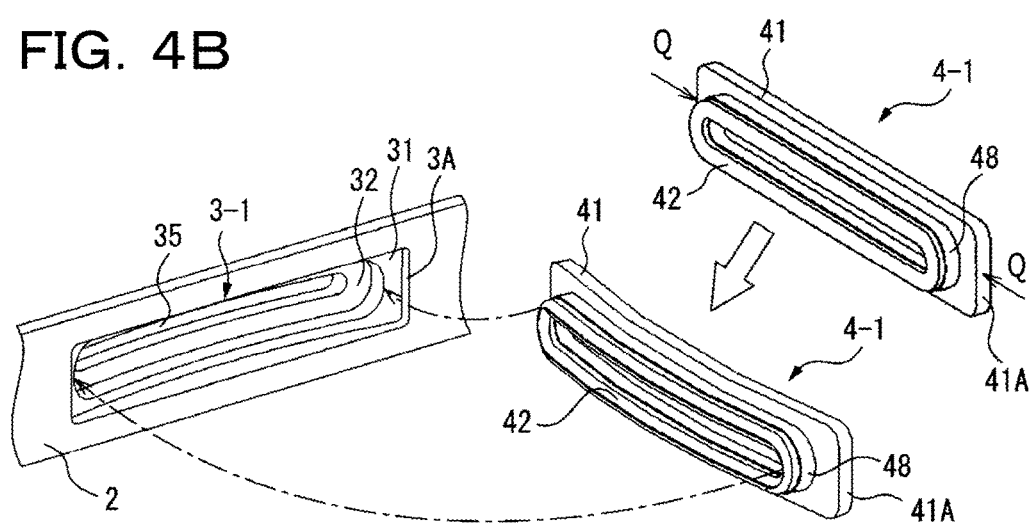
FIG. 4B illustrates a process in which the waterproof cap illustrated in FIGS. 2A to 2C is deformed as illustrated in FIGS. 3A to 3C and is fitted into the communication hole illustrated in FIG. 4A.

FIG. 4A is a perspective view of a mobile terminal 10-1 as a waterproof apparatus according to a first embodiment that has a first exemplary communication hole 3-1 into which the waterproof cap 4-1 illustrated in FIGS. 3A to 3C is to be fitted. The communication hole 3-1 provided in a side face of a case 2 included in the mobile terminal 10-1 has a short-side length W3 and a long-side length L. FIG. 4B illustrates a process in which the waterproof cap 4-1 illustrated in FIGS. 2A to 2C is deformed as illustrated in FIGS. 3A to 3C and is fitted into the communication hole 3-1 illustrated in FIG. 4A.

FIG. 4B details the shape of the communication hole 3-1 and illustrates the process of deforming the waterproof cap 4-1 to be fitted into the communication hole 3-1. The waterproof cap 4-1 is pressed with the forces Q applied from the two ends thereof and is bent such that a side thereof having the second elastic member 42 becomes convex. The communication hole 3-1 has a first contact surface 31 extending on the inner side of the inner wall 3A thereof. The communication hole 3-1 also has a second contact surface 32 extending on the inner side of the first contact surface 31. A communication hole 35 that allows the inside and the outside of the case 2 to communicate with each other is provided on the inner side of the second contact surface 32. The first contact surface 31 and the second contact surface 32 are each a curved surface.

Figure 4C:
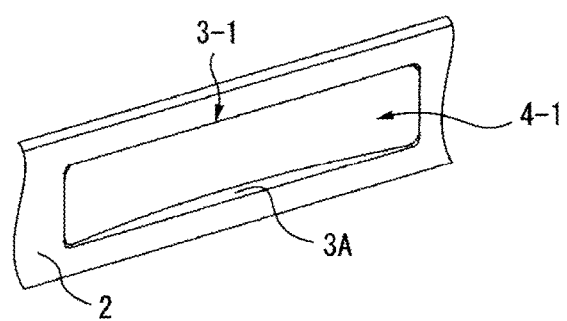
FIG. 4C is a perspective view of the waterproof cap that has been fitted into the communication hole in accordance with the process illustrated in FIG. 4B.

The waterproof cap 4-1 that is bent is inserted into the communication hole 3-1 until the first elastic member 41 comes into contact with the first contact surface 31. When the first elastic member 41 comes into contact with the first contact surface 31, the second elastic member 42 comes into contact with the second contact surface 32. That is, the radius of the second contact surface 32 is defined as X. The waterproof cap 4-1 is fitted into the communication hole 3-1 with the first elastic member 41 kept bent and with the long-side end surfaces 41A of the first elastic member 41 kept in contact with the inner wall 3A of the communication hole 3-1. Actually, the waterproof cap 4-1 is fitted into the communication hole 3-1 such that one of the end surfaces 41A of the first elastic member 41 is brought into contact with the inner wall 3A of the communication hole 3-1. Then, while a central part of the first elastic member 41 is pressed, the other end surface 41A is brought into contact with the inner wall 3A of the communication hole 3-1. FIG. 4C illustrates a state where the first exemplary waterproof cap 4-1 has been fitted into and set in the first exemplary communication hole 3-1. In the state where the first exemplary waterproof cap 4-1 has been fitted into and set in the first exemplary communication hole 3-1, the first elastic member 41 that is bent is concave toward the inner side of the case 2. Therefore, part of the inner wall 3A of the communication hole 3-1 is exposed.

Figure 5A:
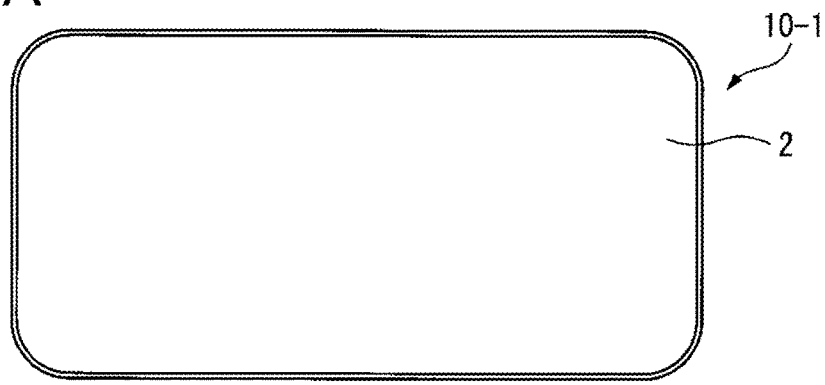
FIG. 5A is a plan view of the mobile terminal according to the first embodiment disclosed.
Figure 5B:
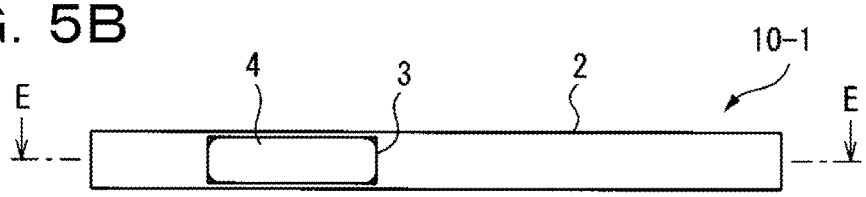
FIG. 5B is a side view of the mobile terminal illustrated in FIG. 5A.
Figure 5C:
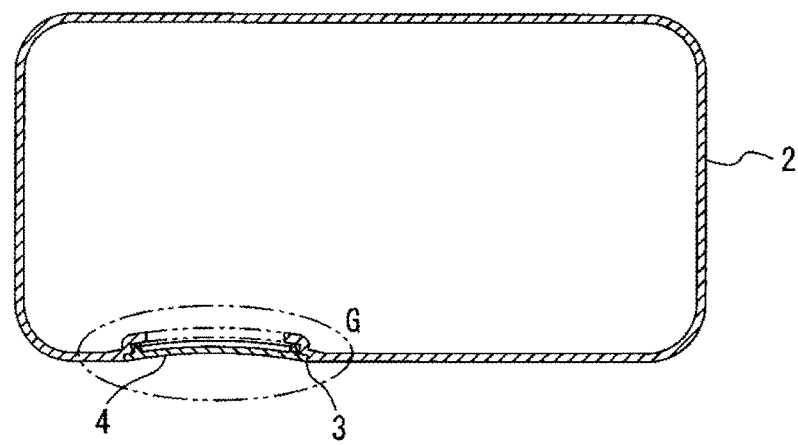
FIG. 5C is a sectional view of a case of the mobile terminal illustrated in FIG. 5B, with the waterproof cap removed.
Figure 5D:
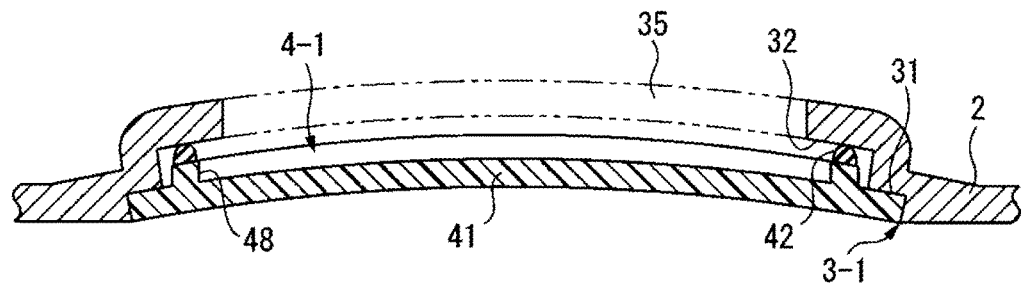
FIG. 5D is an enlarged sectional view of part VD encircled in FIG. 5C.

FIG. 5A is a plan view of the mobile terminal 10-1 according to the first embodiment disclosed. FIG. 5B is a side view of the mobile terminal 10-1 illustrated in FIG. 5A. FIG. 5C is a sectional view of the case 2 of the mobile terminal 10-1 illustrated in FIG. 5B, with the waterproof cap 4-1 removed. FIG. 5D is an enlarged sectional view of part VD encircled in FIG. 5C. FIGS. 5C and 5D illustrate the state where the waterproof cap 4-1 is fitted in the communication hole 3-1. Since the waterproof cap 4-1 is fitted into the communication hole 3-1 while the waterproof cap 4-1 is kept deformed, water entry from the joined part between the waterproof cap 4-1 and the communication hole 3-1 is suppressed, although the stiffness of the waterproof cap 4-1 itself is not so increased.

Figure 6A:
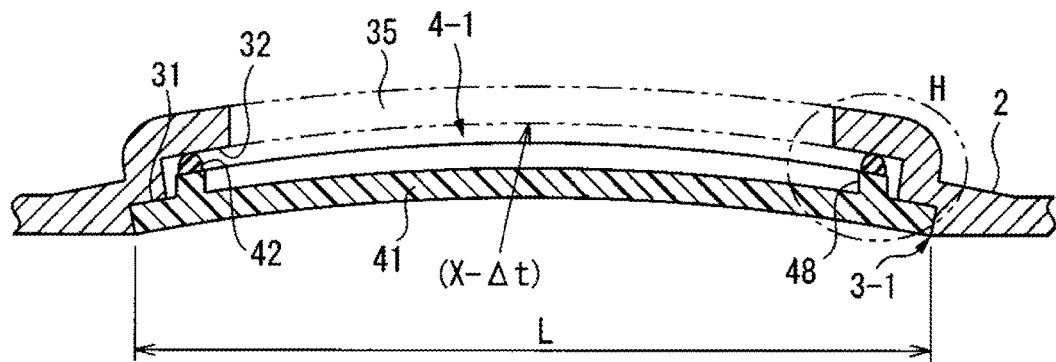
FIG. 6A is an enlarged sectional view corresponding to FIG. 5D and illustrates dimensions of the communication hole and the waterproof cap.
Figure 6B:
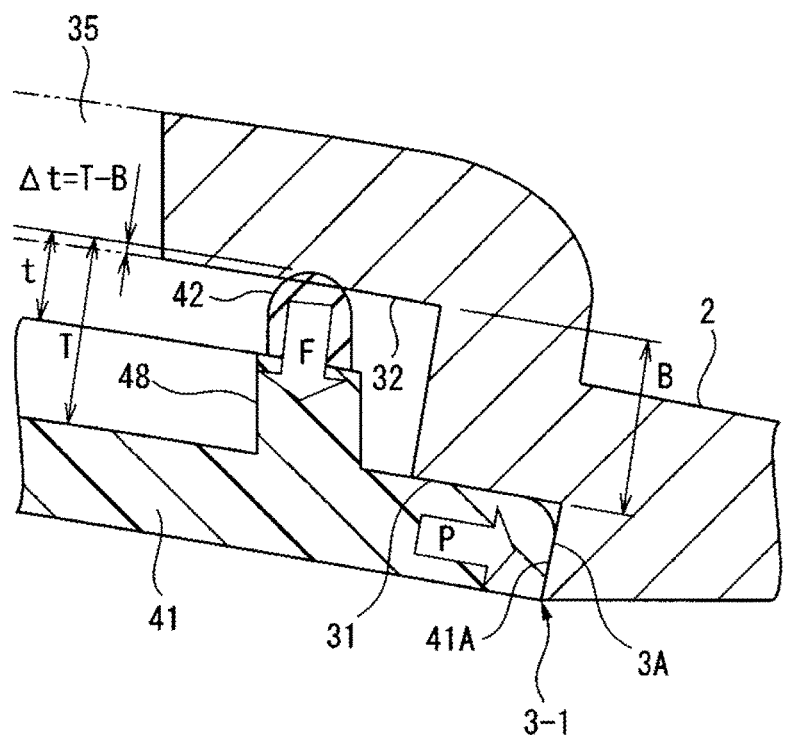
FIG. 6B is an enlargement of part VIB encircled in FIG. 6A and illustrates stresses applied thereto.
Figure 7:
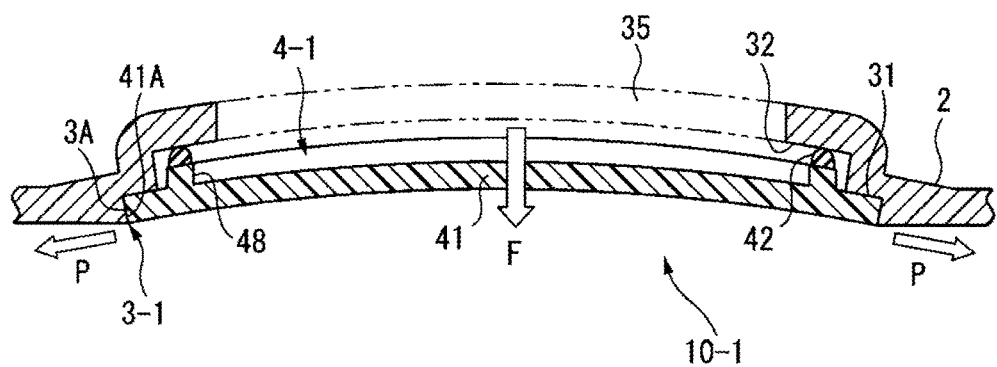
FIG. 7 is an enlarged sectional view corresponding to FIG. 5D and illustrates the stresses with which the waterproof cap is retained in the communication hole.

FIGS. 6A and 6B and FIGS. 7 and 8 illustrate dimensions of associated elements in the state where the waterproof cap 4-1 is fitted in the communication hole 3-1, and the relationship among the forces acting between the communication hole 3-1 and the waterproof cap 4-1. When the waterproof cap 4-1 is fitted into the communication hole 3-1, the first elastic member 41 having the original length U tends to restore its original shape in the communication hole 3-1 having the long-side length L as denoted in FIG. 6A. Hence, as illustrated in FIGS. 6B and 7, the end surfaces 41A of the first elastic member 41 press the inner wall 3A of the communication hole 3-1. On the other hand, the depth of the communication hole 3-1 from the surface of the case 2 to the second contact surface 32 is smaller than the height T from the surface of the first elastic member 41 to the end of the second elastic member 42 denoted in FIG. 3B. Therefore, when the waterproof cap 4-1 is fitted into the communication hole 3-1, the second elastic member 42 is compressed and the height of the second elastic member 42 becomes smaller than its original height t.

Here, let the coefficient of static friction between each of the end surfaces 41A of the first elastic member 41 and the inner wall 3A of the communication hole 3-1 be $\mu$, the reaction force generated when the first elastic member 41 is deformed be P, and the reaction force generated when the second elastic member 42 is compressed be F. The condition for retaining the position of the first elastic member 41 fitted in the communication hole 3-1 is expressed as $\mu P > F$. Hence, the materials for the first elastic member 41 and the second elastic member 42 and the dimensions of the communication hole 3-1 are determined in accordance with this condition, so that the static-friction coefficient $\mu$, the reaction force P, and the reaction force F satisfies the condition $\mu P > F$. Typically, if the first elastic member 41 is made of any of resin, metal, hard rubber, and the like while the second elastic member 42 is made of a softer material such as soft rubber, the waterproof cap 4-1 is provided with ease of handling and a satisfactory level of waterproofness.

Figure 8:
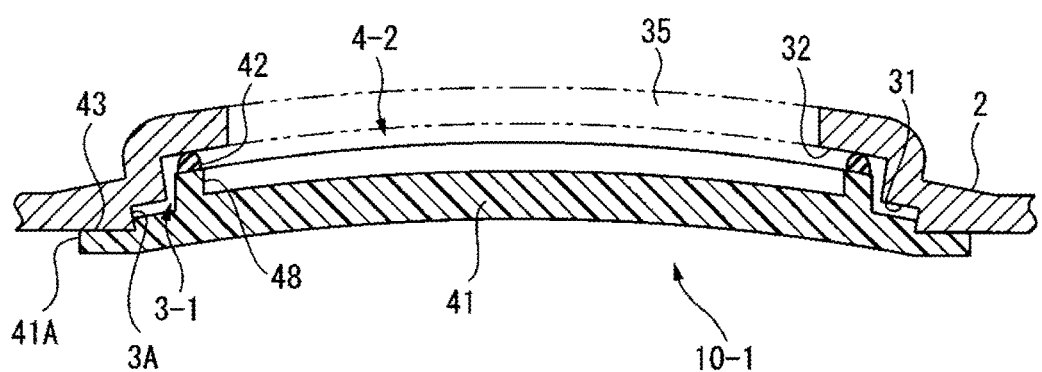
FIG. 8 is an enlarged sectional view of a second exemplary waterproof cap that is fitted in the first exemplary communication hole.

According to the first embodiment described above, the waterproof cap 4-1 is fitted into the communication hole 3-1 while the two end surfaces 41A of the first elastic member 41 are brought into contact with the inner wall 3A of the communication hole 3-1. Alternatively, as illustrated in FIG. 8, a second exemplary first elastic member 41 including contact portions 43 at the two respective end surfaces 41A thereof may be employed. In such an example, the contact portions 43 of the first elastic member 41 are brought into contact with the inner wall 3A of the communication hole 3-1, whereby the first elastic member 41 is retained in the communication hole 3-1. The mobile terminal 10-1 according to the first embodiment disclosed is established if the contact surfaces (for the contact in the long-side direction and for the contact in the depth direction) that receive the first elastic member 41 and the contact surface that receives the second elastic member 42 are located in the communication hole 3-1. That is, the position of the contact surface that receives the first elastic member 41 in the depth direction may be changed.

Figure 9A:
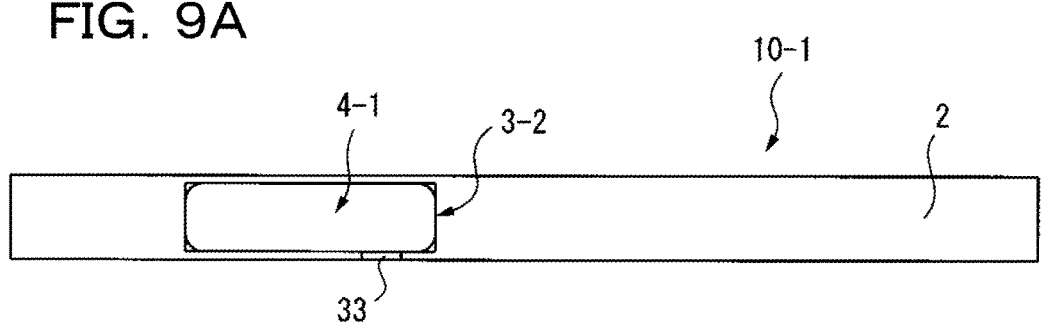
FIG. 9A is a side view of a modification of the mobile terminal according to the first embodiment that has a second exemplary communication hole.
Figure 9B:
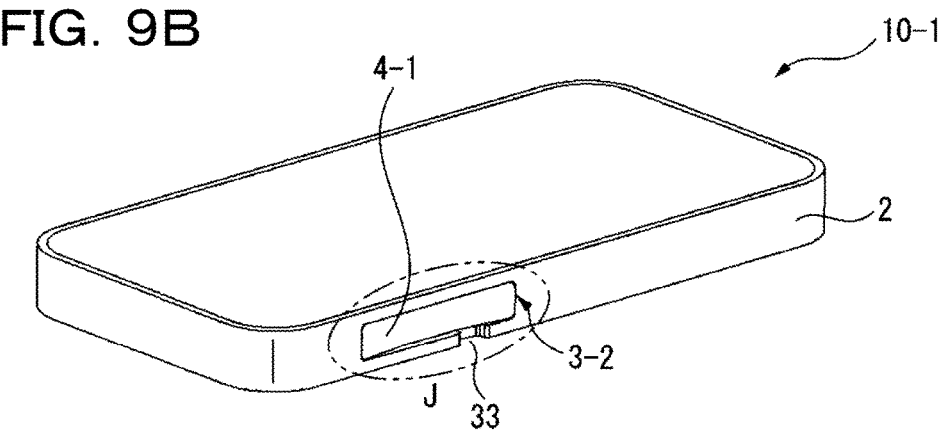
FIG. 9B is a perspective view of the mobile terminal illustrated in FIG. 9A.
Figure 9C:
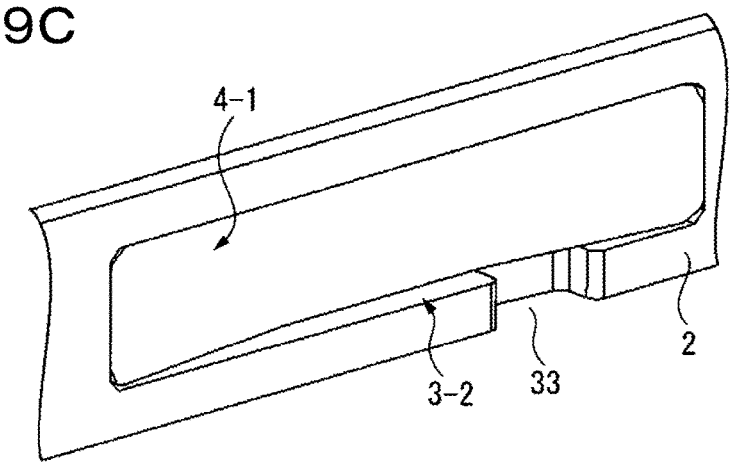
FIG. 9C is an enlarged perspective view of part IXC encircled in FIG. 9B.

FIG. 9A is a side view of a modification of the mobile terminal 10-1 according to the first embodiment that has a second exemplary communication hole 3-2. FIG. 9B is a perspective view of the mobile terminal 10-1 illustrated in FIG. 9A. FIG. 9C is an enlarged perspective view of part IXC encircled in FIG. 9B. In this modification of the mobile terminal 10-1 according to the first embodiment, the case 2 has a cut 33 that is continuous with the periphery of the communication hole 3-2. In such a configuration, the waterproof cap 4-1 is easily detached from the communication hole 3-2 by inserting a stick-like detaching jig or a pick (not illustrated) into the cut 33 and pushing the backside of the waterproof cap 4-1 outward.

Figure 10A:
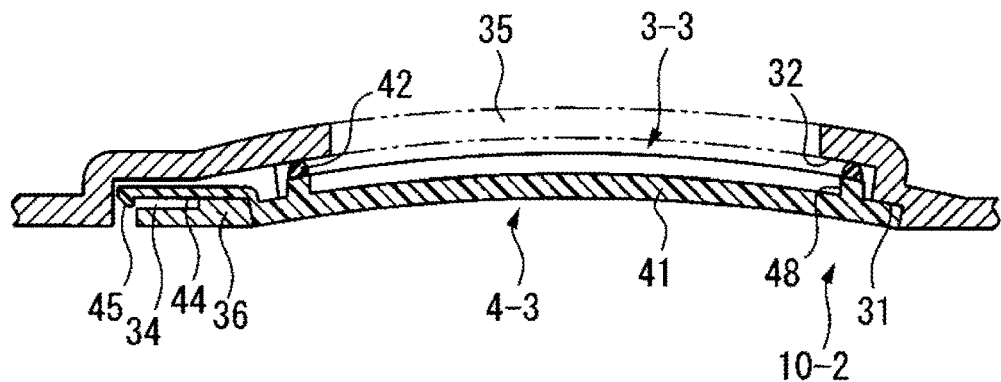
FIG. 10A is an enlarged sectional view of waterproof part of a waterproof apparatus according to a second embodiment that has a third exemplary communication hole and a third exemplary waterproof cap fitted therein.
Figure 10B:
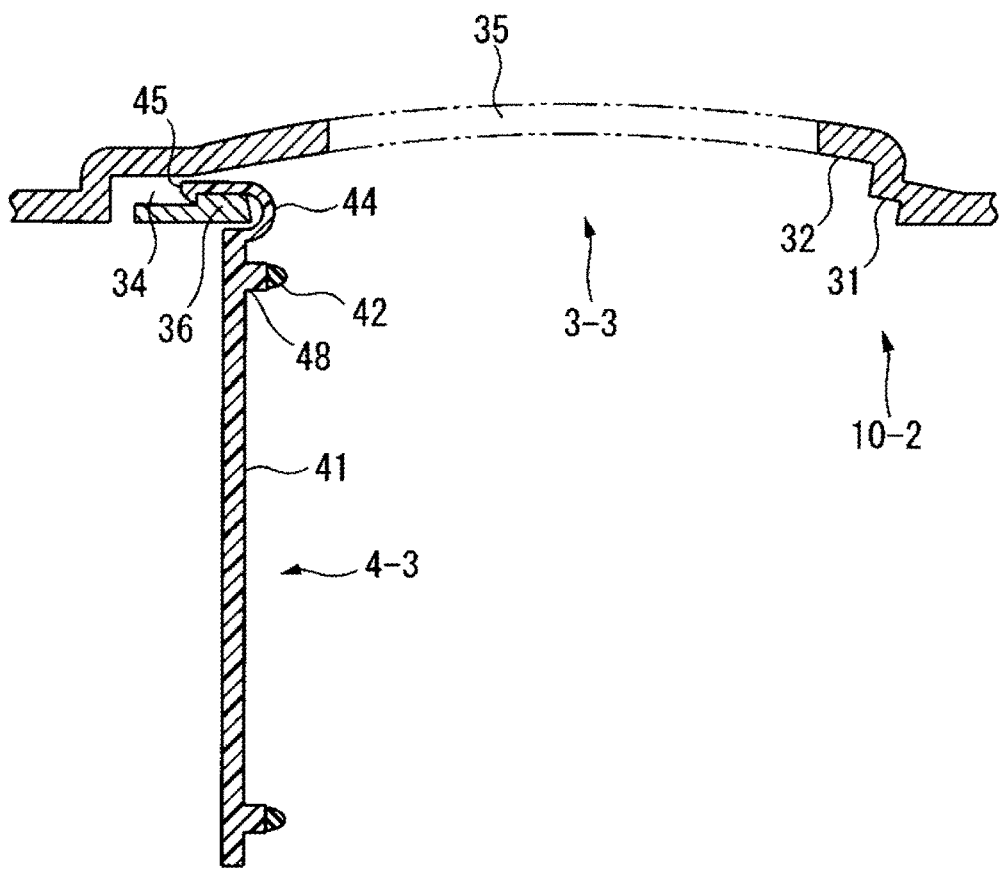
FIG. 10B is another enlarged sectional view of the waterproof apparatus according to the second embodiment, with the waterproof cap open.

FIG. 10A is an enlarged sectional view of waterproof part of a waterproof apparatus (mobile terminal) 10-2 according to a second embodiment in which a third exemplary waterproof cap 4-3 is fitted in a third exemplary communication hole 3-3. FIG. 10B is another enlarged sectional view of the waterproof apparatus 10-2 illustrated in FIG. 10A, with the waterproof cap 4-3 open.

In the waterproof apparatus 10-2 according to the second embodiment, one of the long-side ends of the waterproof cap 4-3 is extended in the long-side direction, thereby having a throat 44 provided with a hook 45 at the tip thereof. The communication hole 3-3 is provided with a throat-receiving hole 34 into which the throat 44 is inserted when the waterproof cap 4-3 is fitted into the communication hole 3-3. A locking projection 36 is provided in the throat-receiving hole 34. The locking projection 36 engages with the hook 45 of the throat 44 inserted into the throat-receiving hole 34, thereby suppressing the coming off of the hook 45 from the throat-receiving hole 34. The waterproof cap 4-3 is fitted into the communication hole 3-3 with the throat 44 set in the throat-receiving hole 34 of the communication hole 3-3. When the waterproof cap 4-3 is detached from the communication hole 3-3, the throat 44 in the throat-receiving hole 34 is pulled out of the throat-receiving hole 34 until the hook 45 at the tip of the throat 44 comes into contact with the locking projection 36. Hence, the waterproof cap 4-3 is kept connected to the case 2 at the throat 44, which keeps the waterproof cap 4-3 not being separated from the case 2. In the mobile terminal 10-2 according to the second embodiment, the probability of losing the waterproof cap 4-3 at the detaching of the waterproof cap 4-3 from the communication hole 3-3 is reduced.

Figure 11A:
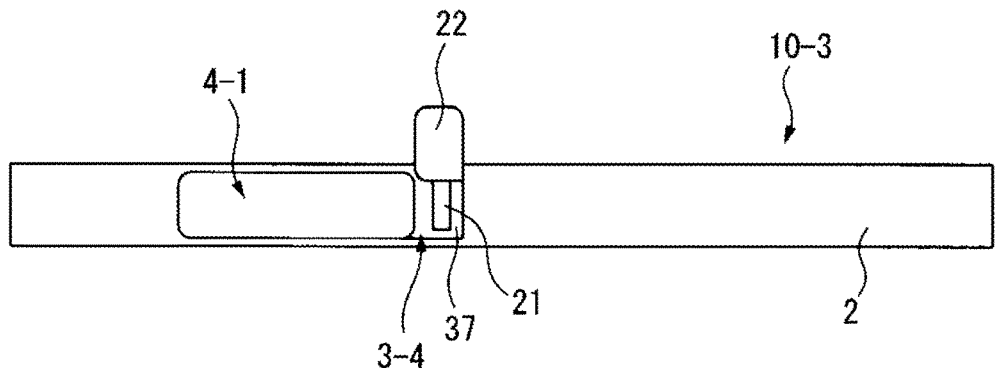
FIG. 11A is a side view of a waterproof apparatus according to a third embodiment that has a fourth exemplary communication hole and the first exemplary waterproof cap, and illustrates a state before the waterproof cap fitted into the communication hole is locked.
Figure 11B:
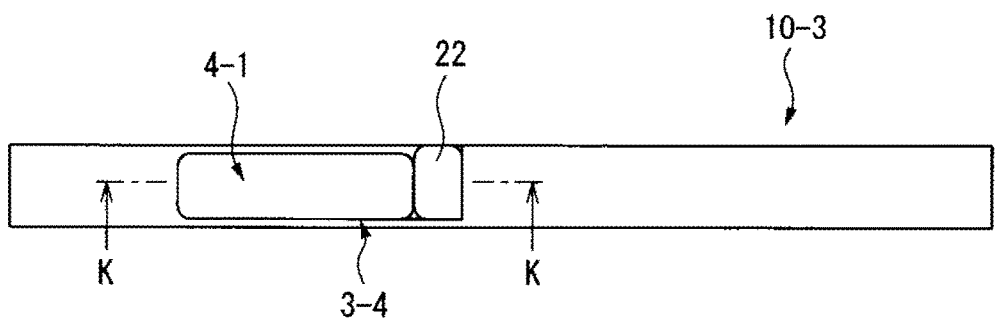
FIG. 11B is another side view of the waterproof apparatus and illustrates a state after the first exemplary waterproof cap fitted into the fourth exemplary communication hole is locked.
Figure 11C:
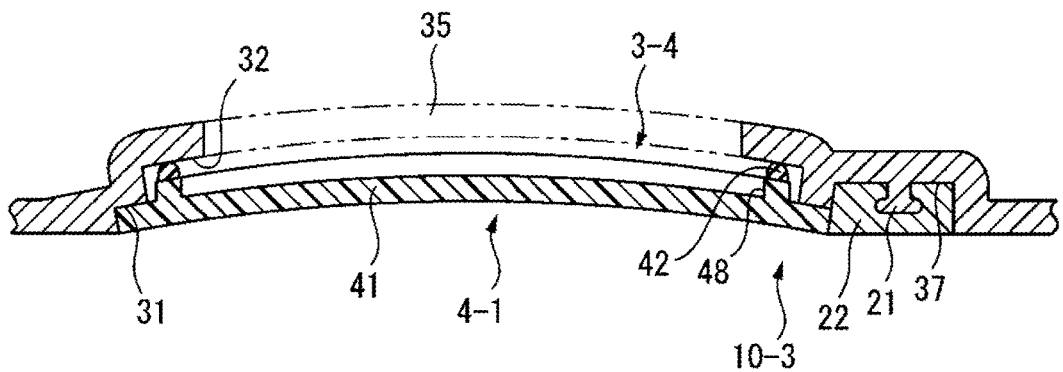
FIG. 11C is an enlarged sectional view of the waterproof apparatus that is taken along line XIC-XIC illustrated in FIG. 11B.

FIGS. 11A to 11C illustrate a mobile terminal 10-3 as a waterproof apparatus according to a third embodiment. The mobile terminal 10-3 includes a fourth exemplary communication hole 3-4 and the first exemplary waterproof cap 4-1. FIG. 11A illustrates a state before the first exemplary waterproof cap 4-1 fitted into the fourth exemplary communication hole 3-4 is locked. FIG. 11B illustrates a state after the waterproof cap 4-1 fitted into the communication hole 3-4 as illustrated in FIG. 11A is locked. FIG. 11C is a sectional view taken along line XIC-XIC illustrated in FIG. 11B.

One of the long-side ends of the communication hole 3-4 provided in the mobile terminal 10-3 is provided with a slider-receiving groove 37 that receives a slider 22. The slider-receiving groove 37 is provided with a rail 21 that allows the slider 22 to slide in a direction away from the case 2. The waterproof cap 4-1 fitted into the communication hole 3-4 is locked by the slider 22 that is set in the slider-receiving groove 37. In the mobile terminal 10-3, the waterproof cap 4-1 is easily detachable from the communication hole 3-4 by simply sliding the slider 22 along the rail 21 in the direction away from the case 2 as illustrated in FIG. 11A.

Figure 12A:
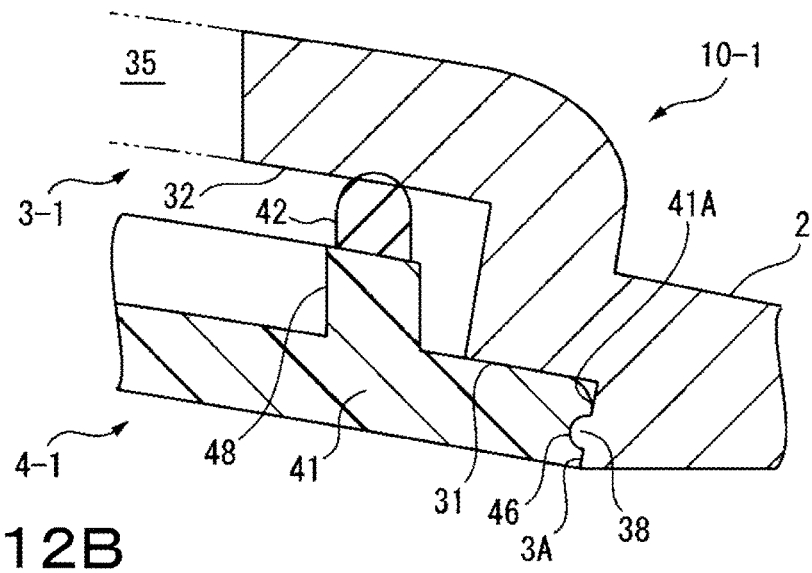
FIG. 12A is an enlarged sectional view of part of the waterproof apparatus according to the first embodiment that has a first modification of the first exemplary communication hole and a first modification of the first exemplary waterproof cap fitted therein.

FIG. 12A is an enlarged sectional view of part of the mobile terminal 10-1 that has a first modification of the first exemplary communication hole 3-1 and a first modification of the first exemplary waterproof cap 4-1 fitted therein. The first elastic member 41 of the first modification of the waterproof cap 4-1 has a recess 46 at each of the end surfaces 41A thereof. Furthermore, the first modification of the communication hole 3-1 has a projection 38 on the inner wall 3A thereof with which the end surface 41A of the first elastic member 41 comes into contact. The projection 38 and the recess 46 are in engagement with each other. With such an engagement between the projection 38 and the recess 46, the first elastic member 41 is less likely to come off the communication hole 3-1 even if any impact is applied to the mobile terminal 10-1. The recess and the projection provided to the end surface 41A of the first elastic member 41 and the inner wall 3A of the communication hole 3-1, respectively, may be exchanged.

Figure 12B:
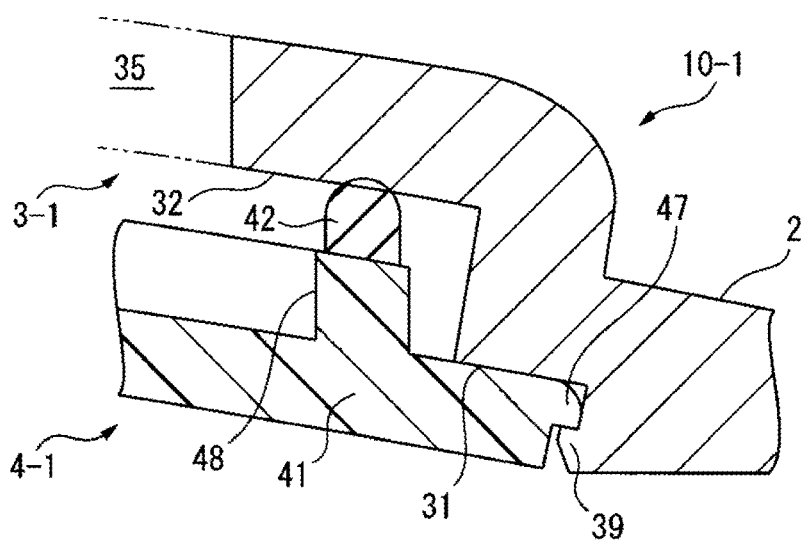
FIG. 12B is an enlarged sectional view of part of the waterproof apparatus according to the first embodiment that has a second modification of the first exemplary communication hole and a second modification of the first exemplary waterproof cap fitted therein.

FIG. 12B is an enlarged sectional view of part of the mobile terminal 10-1 that has a second modification of the first exemplary communication hole 3-1 and a second modification of the first exemplary waterproof cap 4-1 fitted therein. The first elastic member 41 of the second modification of the waterproof cap 4-1 has a ridge 47 on the inner side of the end thereof. Furthermore, the second modification of the communication hole 3-1 has an engaging projection 39 on the outer side of the inner wall 3A thereof with which the end of the first elastic member 41 comes into contact. The engaging projection 39 and the ridge 47 are in engagement with each other. With such an engagement between the engaging projection 39 and the ridge 47, the first elastic member 41 is less likely to come off the communication hole 3-1 even if any impact is applied to the mobile terminal 10-1.

Figure 12C:
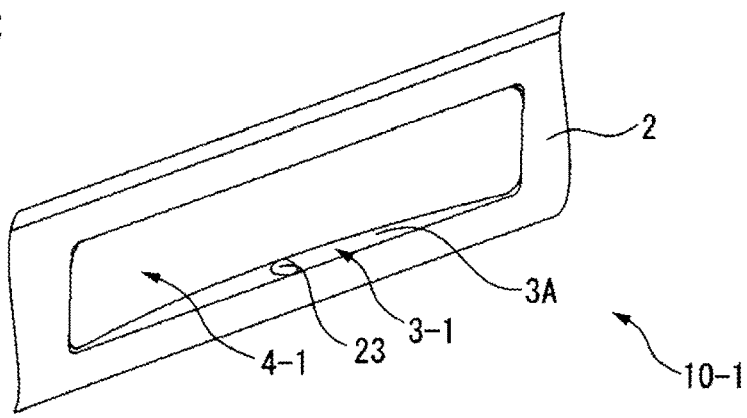
FIG. 12C is a perspective view of part of the waterproof apparatus according to the first embodiment that has a third modification of the first exemplary communication hole and the first exemplary waterproof cap fitted therein.

FIG. 12C is a perspective view of part of the mobile terminal 10-1 that has a third modification of the first exemplary communication hole 3-1 and the first exemplary waterproof cap 4-1 fitted therein. The inner wall 3A of the third modification of the communication hole 3-1 has a dome-shaped protrusion 23 in a central part of a portion thereof that is exposed in the state where the waterproof cap 4-1 is fitted in the communication hole 3-1. The protrusion 23 may be provided either on one side or on each of two sides of the inner wall 3A that face each other in the state where the two sides are exposed. With the presence of the protrusion 23, the first elastic member 41 is less likely to come off the communication hole 3-1 even if any impact is applied to the mobile terminal 10-1.

Figure 13A:
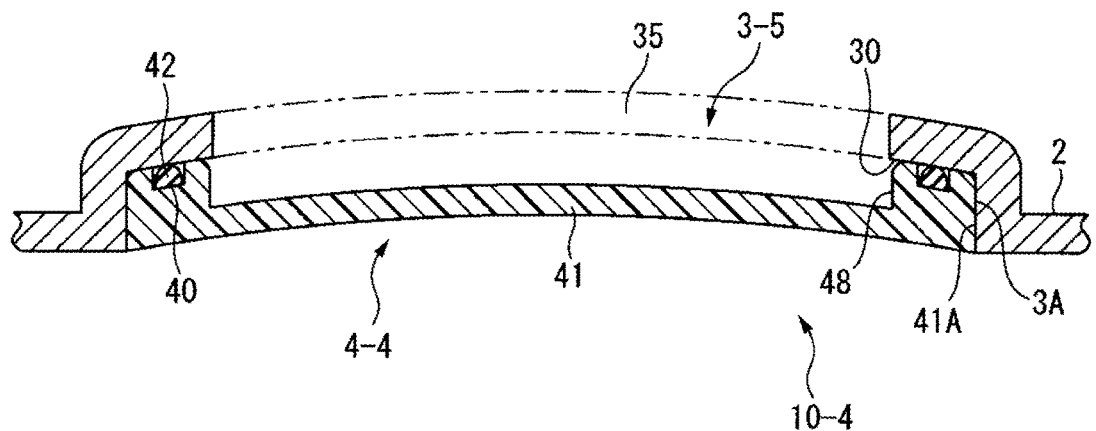
FIG. 13A is a sectional view of part of a waterproof apparatus according to a fourth embodiment that has a fifth exemplary communication hole and a fourth exemplary waterproof cap fitted therein.

FIG. 13A is a sectional view of part of a mobile terminal 10-4 according to a fourth embodiment that has a fifth exemplary communication hole 3-5 and a fourth exemplary waterproof cap 4-4 fitted therein. The fifth exemplary communication hole 3-5 is provided with a contact surface 30 on the inner side of the inner wall 3A. The communication hole 35 is provided on the inner side of the contact surface 30. The fourth exemplary waterproof cap 4-4 includes a plate-like first elastic member 41 that is longer than the communication hole 3-5 in the long-side direction of the communication hole 3-5. The peripheral wall 48 is provided on a surface of the first elastic member 41 that faces the communication hole 3-5 and at a position that faces the contact surface 30. The peripheral wall 48 has an annular recess 40 at the tip thereof. The second elastic member 42 is fitted in the annular recess 40 but protrudes from the annular recess 40.

The waterproof cap 4-4 is fitted into the communication hole 3-5 with the first elastic member 41 being bent in such a manner as to be convex toward the case 2 and with the tip of the peripheral wall 48 being in contact with the contact surface 30, whereby the end surfaces 41A of the first elastic member 41 come into contact with the inner wall 3A of the communication hole 3-5. In such a state, the second elastic member 42 protruding from the annular recess 40 provided at the tip of the peripheral wall 48 is pressed against the contact surface 30 of the communication hole 3-5, whereby water entry is stopped.

Figure 13B:
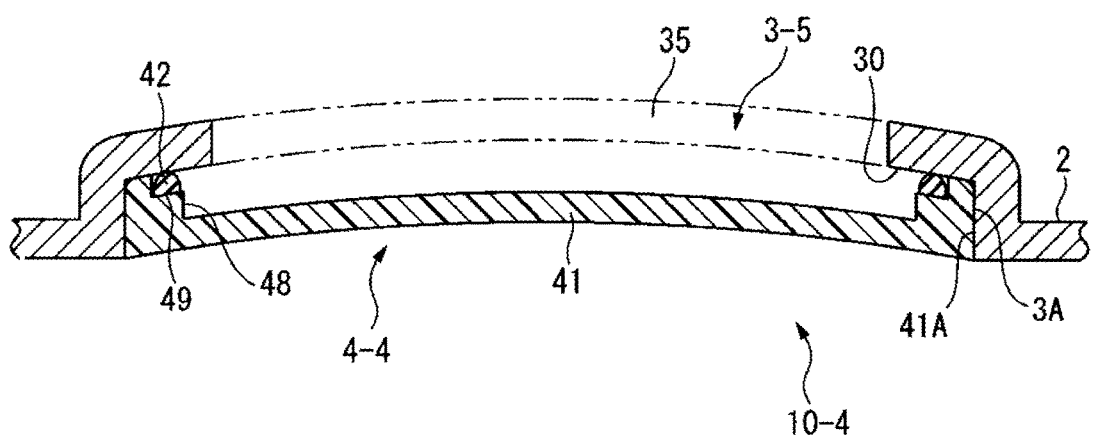
FIG. 13B is a sectional view of part of a modification of the waterproof apparatus according to the fourth embodiment that has the fifth exemplary communication hole and a modification of the fourth exemplary waterproof cap fitted therein.

FIG. 13B is a sectional view of part of a modification of the mobile terminal 10-4 according to the fourth embodiment that has a fifth exemplary communication hole 3-5 and a modification of the fourth exemplary waterproof cap 4-4 is fitted therein. The fifth exemplary communication hole 3-5 is provided with a contact surface 30 on the inner side of the inner wall 3A. The communication hole 35 is provided on the inner side of the contact surface 30. The fourth exemplary waterproof cap 4-4 includes a plate-like first elastic member 41 that is longer than the communication hole 3-5 in the long-side direction of the communication hole 3-5. The peripheral wall 48 is provided on a surface of the first elastic member 41 that faces the communication hole 3-5 and at a position that faces the contact surface 30. The peripheral wall 48 has an annular stepped portion 49 at the tip thereof. The second elastic member 42 is held in the annular stepped portion 49 but protrudes from the annular stepped portion 49.

The waterproof cap 4-4 is fitted into the communication hole 3-5 with the first elastic member 41 being bent in such a manner as to be convex toward the case 2 and with the tip of the peripheral wall 48 being in contact with the contact surface 30, whereby the end surfaces 41A of the first elastic member 41 come into contact with the inner wall 3A of the communication hole 3-5. In such a state, the second elastic member 42 protruding from the annular stepped portion 49 provided at the tip of the peripheral wall 48 is pressed against the contact surface 30 of the communication hole 3-5, whereby water entry is stopped.

Figure 14A:
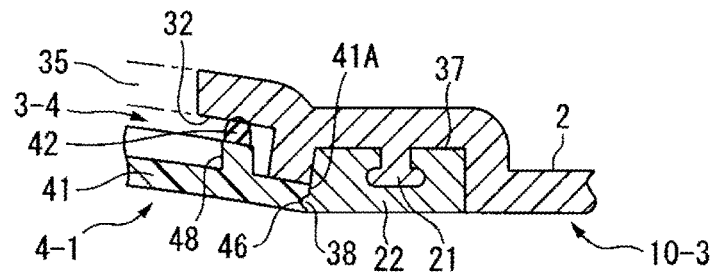
FIG. 14A is a sectional view of part of a modification of the waterproof apparatus according to the third embodiment in which the configuration illustrated in FIG. 12A is employed for the engagement between the waterproof cap and a slider.
Figure 14B:
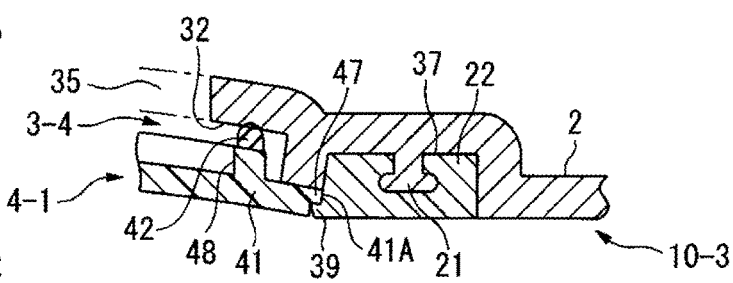
FIG. 14B is a sectional view of part of another modification of the waterproof apparatus according to the third embodiment in which the configuration illustrated in FIG. 12B is employed for the engagement between the waterproof cap and the slider.

Other modifications as combinations of the above individual exemplary elements are also acceptable. Some of such exemplary combinations will be described with reference to FIGS. 14A to 14F. FIG. 14A is a sectional view of part of a modification of the mobile terminal 10-3 according to the third embodiment in which the configuration illustrated in FIG. 12A is employed for the engagement between the waterproof cap 4-1 and the slider 22. FIG. 14B is a sectional view of part of another modification of the mobile terminal 10-3 according to the third embodiment in which the configuration illustrated in FIG. 12B is employed for the engagement between the waterproof cap 4-1 and the slider 22. Since the end surface 41A of the first elastic member 41 and the side surface of the slider 22 each have a corresponding one of a projection and a recess, the first elastic member 41 is less likely to come off the communication hole 3-4.

Figure 14C:
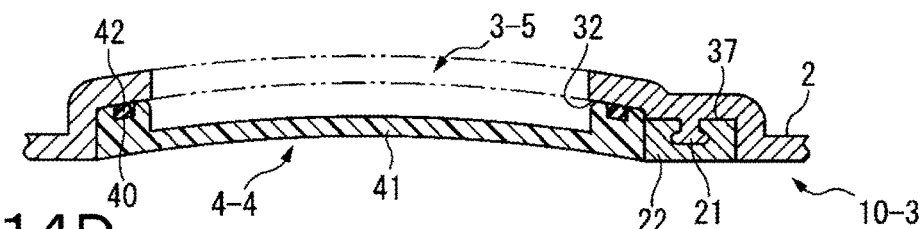
FIG. 14C is a sectional view of part of yet another modification of the waterproof apparatus according to the third embodiment in which the configuration illustrated in FIG. 13A is employed for the engagement between the waterproof cap and the slider.
Figure 14D:
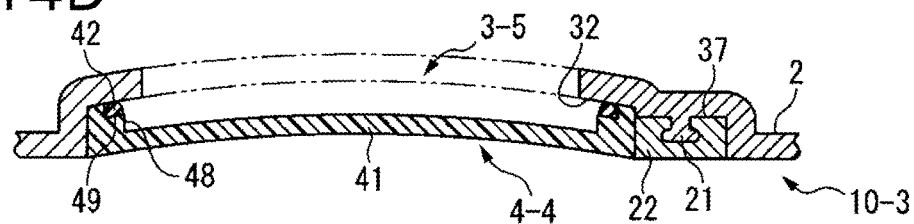
FIG. 14D is a sectional view of part of yet another modification of the waterproof apparatus according to the third embodiment in which the configuration illustrated in FIG. 13B is employed for the engagement between the waterproof cap and the slider.

FIG. 14C is a sectional view of part of yet another modification of the mobile terminal 10-3 according to the third embodiment in which the configuration illustrated in FIG. 13A is employed for the engagement between the waterproof cap 4-4 and the slider 22. FIG. 14D is a sectional view of part of yet another modification of the mobile terminal 10-3 according to the third embodiment in which the configuration illustrated in FIG. 13B is employed for the engagement between the waterproof cap 4-4 and the slider 22.

In each of these modifications, one of the long-side ends of the communication hole 3-5 has the slider-receiving groove 37 that receives the slider 22, and the slider-receiving groove 37 is provided with the rail 21 that allows the slider 22 to slide in the direction away from the case 2. The waterproof cap 4-4 fitted into the communication hole 3-5 is locked by the slider 22 that is set in the slider-receiving groove 37.

Figure 14E:
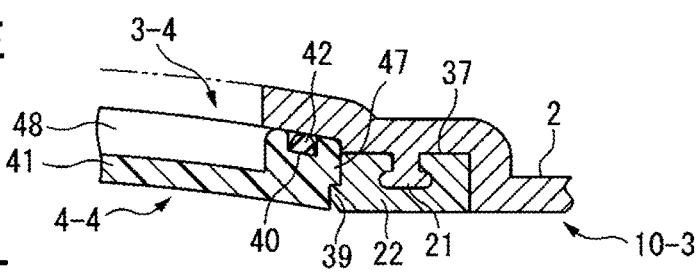
FIG. 14E is a sectional view of part of yet another modification of the waterproof apparatus according to the third embodiment in which a modification of the configuration illustrated in FIG. 14C is employed for the engagement between the waterproof cap and the slider.
Figure 14F:
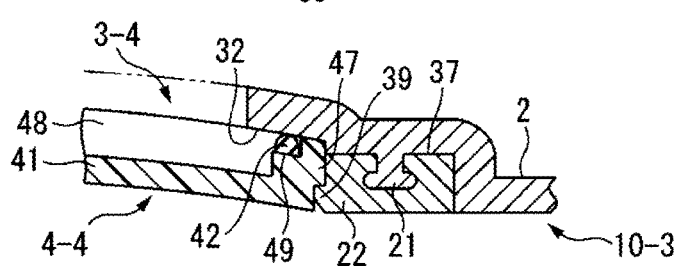
FIG. 14F is a sectional view of part of yet another modification of the waterproof apparatus according to the third embodiment in which a modification of the configuration illustrated in FIG. 14D is employed for the engagement between the waterproof cap and the slider.

FIG. 14E is a sectional view of part of yet another modification of the mobile terminal 10-3 according to the third embodiment in which a modification of the configuration illustrated in FIG. 14C is employed for the engagement between the waterproof cap 4-4 and the slider 22. FIG. 14F is a sectional view of part of yet another modification of the mobile terminal 10-3 according to the third embodiment in which a modification of the configuration illustrated in FIG. 14D is employed for the engagement between the waterproof cap 4-4 and the slider 22. In these modifications, since the end surface 41A of the first elastic member 41 and the side surface of the slider 22 each have a corresponding one of a projection and a recesses, the first elastic member 41 is less likely to come off the communication hole 3-4.

Figure 15A:
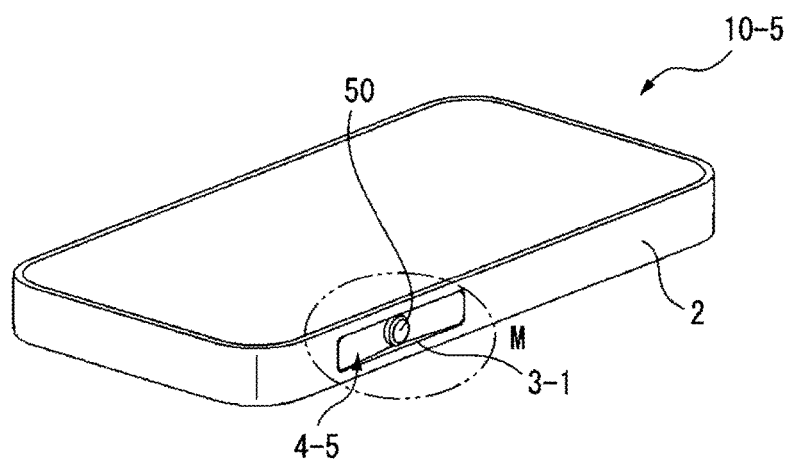
FIG. 15A is a perspective view of a waterproof apparatus according to a fifth embodiment that has the first exemplary communication hole and a fifth exemplary waterproof cap fitted therein.
Figure 15B:
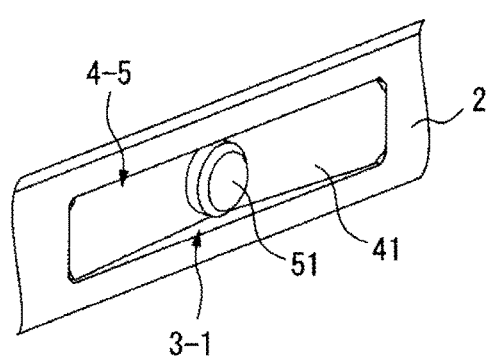
FIG. 15B is an enlarged perspective view of part XVB encircled in FIG. 15A.
Figure 15C:
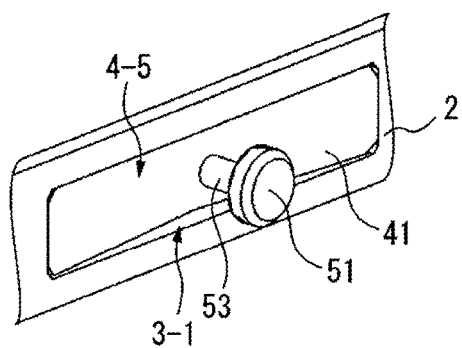
FIG. 15C is another enlarged perspective view of the part XVB, with a pull knob illustrated in FIG. 15B pulled out.
Figure 15D:
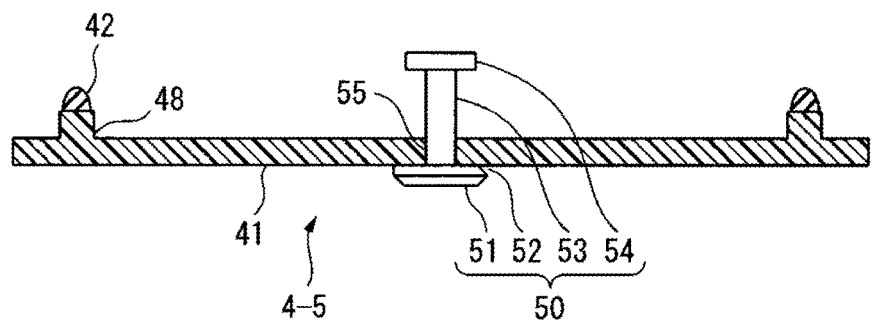
FIG. 15D is a longitudinal sectional view of the fifth exemplary waterproof cap.

FIG. 15A is a perspective view of a mobile terminal 10-5 according to a fifth embodiment that has the first exemplary communication hole 3-1 and a fifth exemplary waterproof cap 4-5 fitted therein. As illustrated in FIG. 15D, the first elastic member 41 has a through hole 55 in a central part thereof, and a pull knob 50 is fitted in the through hole 55.

The pull knob 50 includes a rod portion 53 extending through the through hole 55 and having a length greater than the thickness of the first elastic member 41, a head portion 51 provided at the exposed end of the rod portion 53, and a stopper 54 provided at the other end of the rod portion 53. The rod portion 53 has a cut 52 into which a pick or the like is to be inserted for causing the head portion 51 to pop out. To detach the first elastic member 41 that is in the state illustrated in FIG. 15B from the communication hole 3-1, the head portion 51 is caused to pop out as illustrated in FIG. 15C. Then, the rod portion 53 is pulled. Thus, the stopper 54 pushes the backside of the first elastic member 41. Hence, the waterproof cap 4-5 is easily detachable from the communication hole 3-1.

Figure 16A:
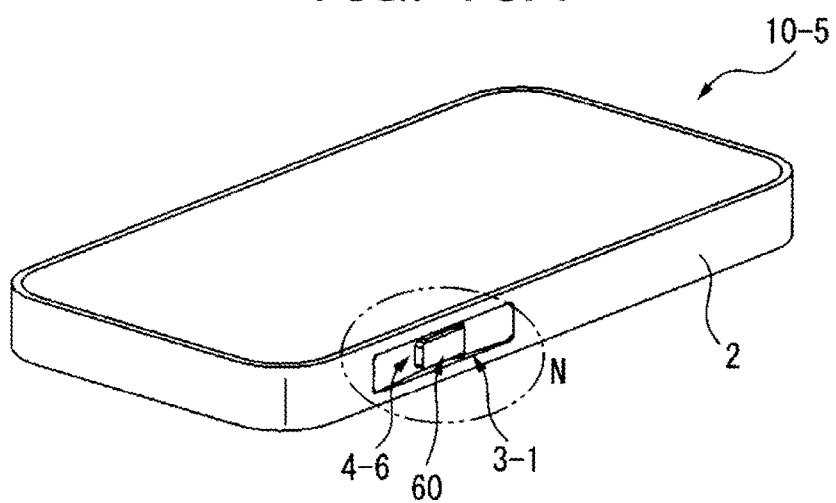
FIG. 16A is a perspective view of a modification of the waterproof apparatus according to the fifth embodiment that has the first exemplary communication hole and a sixth exemplary waterproof cap fitted therein.
Figure 16B:
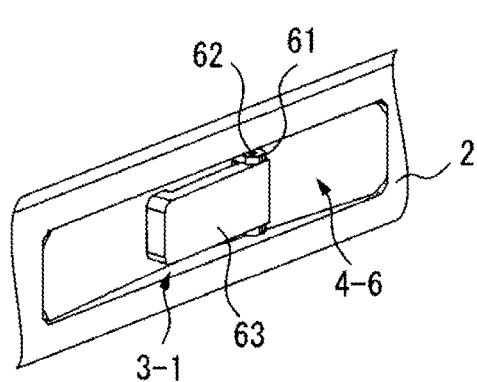
FIG. 16B is an enlarged perspective view of part XVI encircled in FIG. 16A.
Figure 16C:
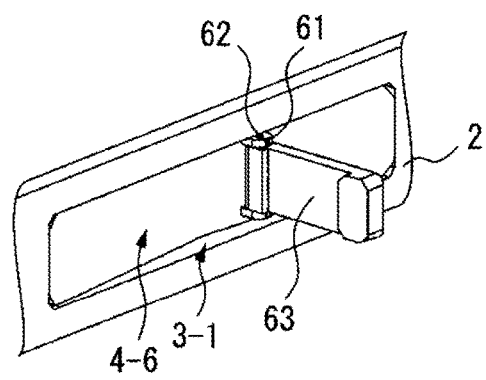
FIG. 16C is another enlarged perspective view of the part XVI, with a pull lever illustrated in FIG. 16B pulled up.

FIG. 16A is a perspective view of a modification of the mobile terminal 10-5 according to the fifth embodiment that has the first exemplary communication hole 3-1 and a sixth exemplary waterproof cap 4-6 fitted therein. As illustrated in FIG. 16B, the first elastic member 41 has a pull lever 60 in a central part thereof. The pull lever 60 includes a pair of brackets 61 provided on the first elastic member 41, a rotating shaft 62 bridging the gap between the pair of brackets 61, and a lever 63 attached to the rotating shaft 62. To detach the first elastic member 41 from the communication hole 3-1, the lever 63 is raised from the first elastic member 41 and is pulled. Thus, the waterproof cap 4-6 is easily detachable from the communication hole 3-1.

As described above, in each of the waterproof apparatuses 10 such as the mobile terminals 10 disclosed, the waterproof cap 4 that is bent in the long-side direction is fitted into the communication hole 3 provided in the case 2. Therefore, the load-bearing capacity of the first elastic member 41 with respect to the repulsive force exerted by the second elastic member 42 provided for stopping water entry is greater than in a case where the first elastic member 41 is not deformable. Consequently, the thickness of the first elastic member 41 is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A waterproof apparatus comprising:
   a case having a communication hole that allows an inside and an outside of the case to communicate with each other; and
   a waterproof cap that closes the communication hole,
   wherein a first contact surface and a second contact surface extend in the communication hole and at different levels,
   wherein the waterproof cap includes
   a plate-like first elastic member that is longer than the communication hole in a long-side direction of the communication hole; and
   a second elastic member attached to a surface of the first elastic member, the surface facing the communication hole, and
   wherein when the first elastic member that is in a bent state is brought into contact with the first contact surface, the waterproof cap is retained on an inner wall of the communication hole with a restoring force exerted by the first elastic member while the second elastic member comes into contact with the second contact surface such that water entry is stopped,
   the communication hole has, at one of long-side ends, a slider-receiving groove that receives a slider,
   the slider-receiving groove has a rail that allows the slider to move in a direction away from the case, and
   the waterproof cap fitted into the communication hole is locked in a state where the slider is set in the slider-receiving groove.

2. The waterproof apparatus according to claim 1, wherein the first contact surface and the second contact surface are curved surfaces that conform to a shape of the first elastic member that is in a bent state.

3. The waterproof apparatus according to claim 1, wherein the first elastic member includes a peripheral wall at a position that faces the second contact surface, and
   wherein the second elastic member is attached to a top surface of the peripheral wall.

4. The waterproof apparatus according to claim 1, wherein the case has a cut that is continuous with a periphery of the communication hole, and
   wherein the waterproof cap is detachable from the communication hole by inserting a detaching jig into the cut.

5. The waterproof apparatus according to claim 1, wherein an end surface of the first elastic member and the inner wall of the communication hole each have a corresponding one of a projection and a recess that suppress coming off of the first elastic member from the communication hole.

6. The waterproof apparatus according to claim 2, wherein a portion of the inner wall of the communication hole that is exposed with the waterproof cap fitted in the communication hole has a protrusion that suppresses coming off of the waterproof cap from the communication hole.

7. The waterproof apparatus according to claim 1, wherein the waterproof cap has, at one of long-side ends, a throat that is formed by extending the one end in the long-side direction, the throat having a hook at a tip,
   wherein the communication hole includes a throat-receiving hole into which the throat is to be inserted when the waterproof cap is fitted into the communication hole,
   wherein a locking projection projects in the throat-receiving hole, and the locking projection engages with the hook of the throat inserted into the throat-receiving hole and suppresses coming off of the hook from the throat-receiving hole, and wherein when the waterproof cap is detached from the communication hole, the hook and the locking projection engage with each other while the waterproof cap is kept connected to the case at the throat.

8. A waterproof apparatus comprising:

a case having a communication hole that allows an inside and an outside of the case to communicate with each other; and a waterproof cap that closes the communication hole, wherein a contact surface extends in the communication hole, wherein the waterproof cap includes a plate-like first elastic member that is longer than the communication hole in a long-side direction of the communication hole;

a peripheral wall standing from a surface of the first elastic member, the surface facing the communication hole, and at a position that faces the contact surface, the peripheral wall having a tip that is to be brought into contact with the contact surface; and a second elastic member held on the peripheral wall, and wherein when the tip of the peripheral wall is brought into contact with the contact surface while the first elastic member is in a bent state, the waterproof cap is retained on an inner wall of the communication hole with a restoring force exerted by the first elastic member while the second elastic member is brought into contact with the contact surface such that water entry is stopped, the communication hole has, at one of long-side ends, a slider-receiving groove that receives a slider, the slider-receiving groove has a rail that allows the slider to move in a direction away from the case, and the waterproof cap fitted into the communication hole is locked in a state where the slider is fitted in the slider-receiving groove.

9. The waterproof apparatus according to claim 8, wherein the peripheral wall has an annular recess at the tip, and wherein a portion of the second elastic member is fitted in the annular recess.

10. The waterproof apparatus according to claim 8, wherein the peripheral wall has an annular stepped portion on an inner side of the tip, and wherein a portion of the second elastic member is held in the annular stepped portion.

11. The waterproof apparatus according to claim 8, wherein an end surface of the first elastic member and a side surface of the slider each have a corresponding one of a projection and a recess that suppress coming off of the first elastic member from the communication hole.

12. The waterproof apparatus according to claim 8, wherein the first elastic member has a through hole in a central part, wherein a pull knob extends through the through hole, wherein the pull knob includes a rod portion extending through the through hole and having a greater length than a thickness of the first elastic member;

a head portion attached to an exposed end of the rod portion; and a stopper attached to an other end of the rod portion that is opposite the exposed end, and wherein the waterproof cap is detached from the communication hole by pulling out the head portion such that a backside of the first elastic member is pushed by the stopper.

13. A waterproof apparatus comprising:

a case having a communication hole that allows an inside and an outside of the case to communicate with each other; and a waterproof cap that closes the communication hole, a contact surface extends in the communication hole, the waterproof cap includes a plate-like first elastic member that is longer than the communication hole in a long-side direction of the communication hole;

a peripheral wall standing from a surface of the first elastic member, the surface facing the communication hole, and at a position that faces the contact surface, the peripheral wall having a tip that is to be brought into contact with the contact surface; and a second elastic member held on the peripheral wall, and when the tip of the peripheral wall is brought into contact with the contact surface while the first elastic member is in a bent state, the waterproof cap is retained on an inner wall of the communication hole with a restoring force exerted by the first elastic member while the second elastic member is brought into contact with the contact surface such that water entry is stopped, wherein the first elastic member includes a pull lever in a central part, wherein the pull lever includes a pair of brackets attached on the first elastic member;

a rotating shaft that bridges a gap between the pair of brackets; and a lever attached to the rotating shaft, and wherein the waterproof cap is detached from the communication hole by raising the lever from the first elastic member and pulling the lever.

* * * * *